July 1, 1952    J. H. SEFREN    2,601,996
SEAL
Filed July 3, 1947    2 SHEETS—SHEET 1
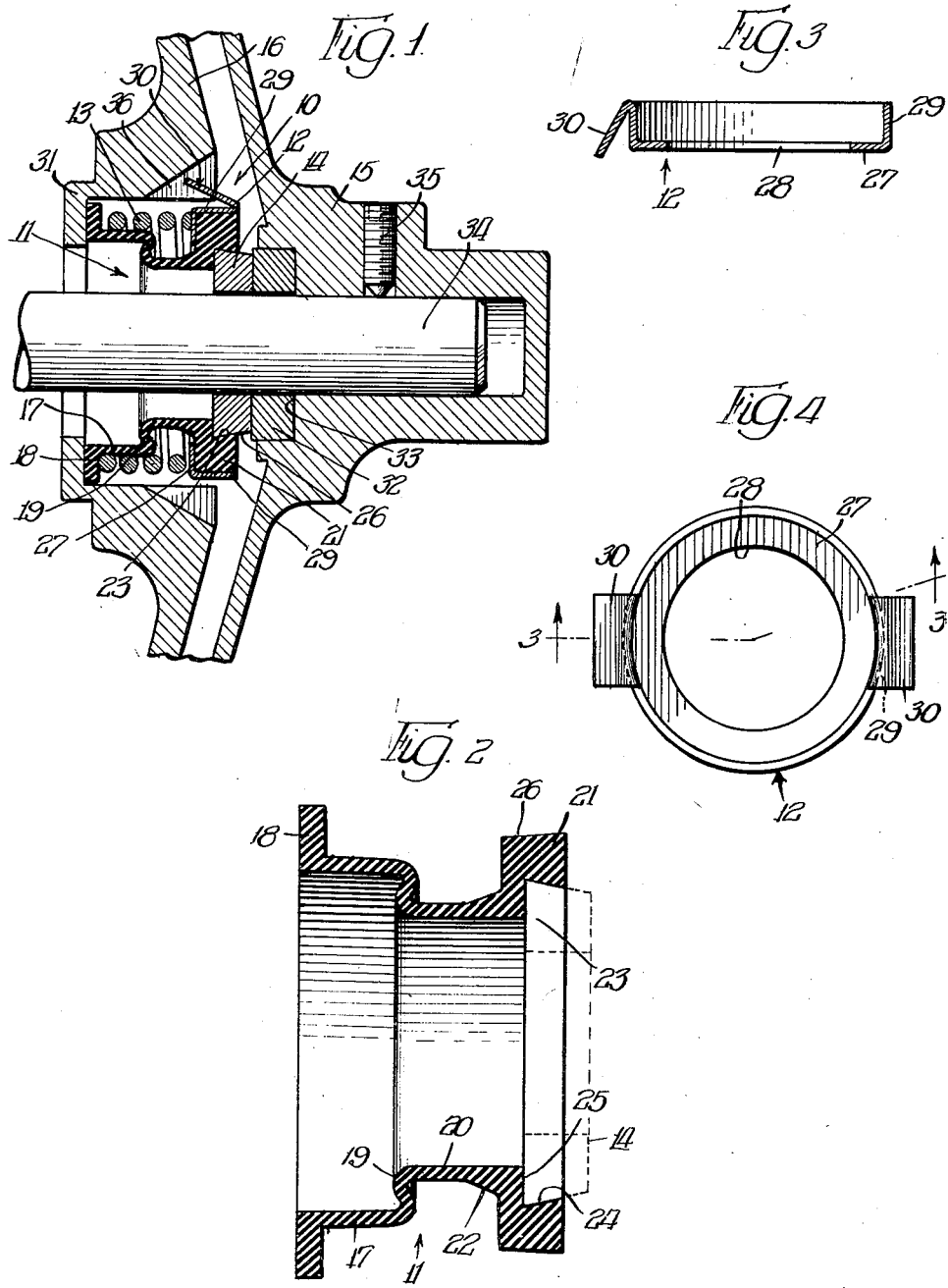
INVENTOR.
John H. Sefren,
BY
Cromwell, Greist & Warden
Attys July 1, 1952      J. H. SEFREN      2,601,996
SEAL
Filed July 3, 1947      2 SHEETS—SHEET 2
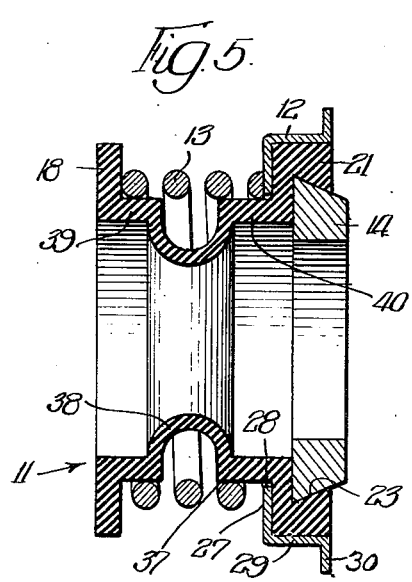
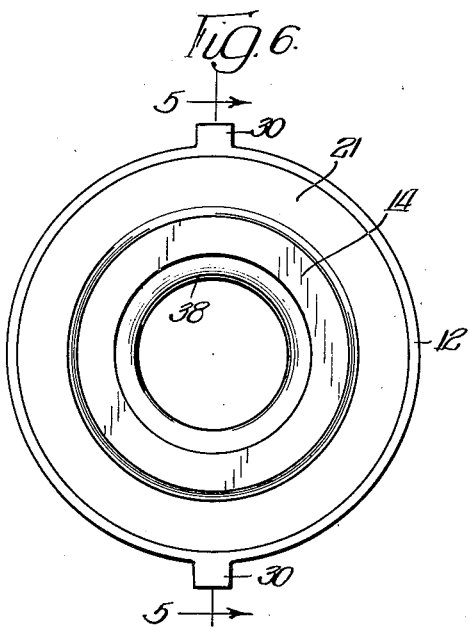
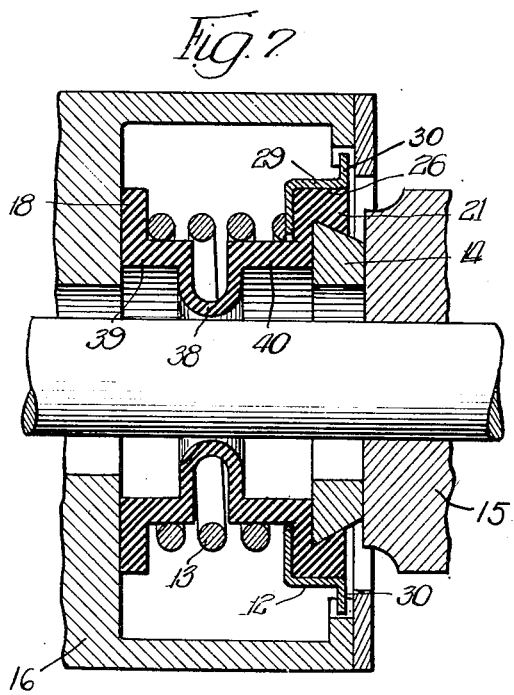
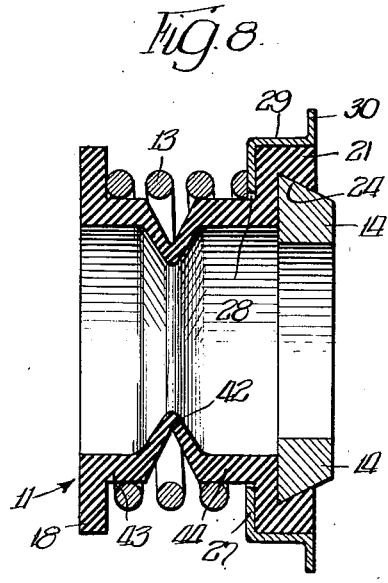
INVENTOR.
John H. Sefren,
BY Cromwell, Greist & Warden
Attys.

Patented July 1, 1952

2,601,996

UNITED STATES PATENT OFFICE 2,601,996

SEAL

John H. Sefren, Chicago, Ill., assignor to Chicago Rawhide Manufacturing Company, Chicago, Ill., a corporation of Illinois Application July 3, 1947, Serial No. 758,882

4 Claims. (Cl. 286—11)

The present invention relates to improvements in oil seals for shafts and the like, and in particular to end face seals of the diaphragm type.

It is an object of the invention to provide an improved diaphragm seal assembly of the type referred to, including an elongated, axially extending or tubular diaphragm of resilient, fluid impervious material having an improved construction rendering the same readily flexible in the axial direction to accommodate end play in operation, said diaphragm also having novel means for associating a separate, annular sealing nosepiece therewith and for preventing inadvertent dislodgment of said nosepiece from the assembly.

Another object is to provide a seal assembly including an elongated, sleeve-like, flexible diaphragm, a separate annular nosepiece associated with said diaphragm in a recess at one axial end thereof and an annular retaining cup disposed in peripherally confining relation to said diaphragm to resist displacement or dislodgment of said nosepiece from said recess, said assembly being characterized by its relatively slight cost of production and by the ease and speed with which the parts thereof are permanently assembled together and installed in operating position relative to a pair of relatively rotatable members to be sealed.

More specifically, it is an object to provide an axially elongated, resilient sleeve-like diaphragm having an annular and radially undercut recess in a thickened end portion thereof, together with a separate rigid nosepiece or sealing element which is removably disposed in said undercut recess and an annular, apertured cup-like retainer telescoped over said thickened portion of the diaphragm in peripheral confining relation thereto, whereby to prevent undesired dislodgment of said nosepiece from said recess by distortion of the material of the diaphragm, there being means associated with said diaphragm and retainer serving to urge the latter in an axial direction and thus to maintain its confining engagement with said thickened diaphragm portion.

A still further specific object is to provide a seal assembly of the foregoing character including a diaphragm member having any one of several novel sectional shapes enabling ready axial telescoping or yielding of the diaphragm in the operation of the seal to accommodate end play of the parts sealed.

The foregoing statements are indicative in a general way of the nature of the invention, but other and more specific objects will be apparent to those skilled in the art upon a full understanding of the construction and operation of the device.

Various embodiments of the invention are presented herein for purpose of exemplification, and it will be appreciated that the invention is susceptible of incorporation in still other modified forms coming equally within the scope of the appended claims.

In the drawings,

Fig. 1 is a fragmentary view in central axial section through an installation of the seal of the invention, in a preferred embodiment thereof, illustrating the general construction of the seal and the relation of its parts to a pair of relatively rotatable members to be sealed;

Fig. 2 is an enlarged view in longitudinal section through the axis of the resilient, fluid impervious diaphragm element of the seal illustrating details of the construction of the diaphragm, and also indicating in broken line the operative relationship to the diaphragm of a separate sealing nosepiece;

Fig. 3 is a view in section through the apertured retaining cup embodied in the seal assembly, being taken on a line corresponding approximately to line 3—3 of Fig. 4;

Fig. 4 is a top plan view of the aforesaid retaining cup;

Fig. 5 is a view in longitudinal central section through the axis of a seal assembly in accordance with a somewhat modified form of the invention, being taken on a line corresponding to line 5—5 of Fig. 6;

Fig. 6 is an end face view of the seal assembly of Fig. 5, viewed from the right-hand side of the last named figure;

Fig. 7 is a fragmentary view in section generally similar to Fig. 5, illustrating the seal assembly of that figure in operative, installed relation to a pair of parts sealed; and Fig. 8 is a sectional view longitudinally of the axis of a still further modified form of seal assembly contemplated by the invention.

The present invention affords an improved, simplified and very expeditiously assembled and installed oil seal of the axial diaphragm type adapted to be employed to seal a pair of relatively rotating parts against loss or leakage of a liquid therebetween, as well as to prevent the entrance of another fluid or of dirt and foreign matter therebetween.

The present improvements are concerned primarily and generally with the provision of a resilient diaphragm seal which is adapted to yield in the axial direction in operation to accommodate repeated end play movements of the members sealed, without becoming inoperative; and also with the provision of novel means for holding a separate rigid face sealing element or nosepiece in operative assembly with the other parts of the seal.

Referring to Figs. 1 to 4 inclusive of the drawings, wherein a preferred embodiment is illustrated, the seal assembly of the invention is generally designated in Fig. 1 by the reference numeral 10. This seal is made up of the axially extending, tubular or sleeve-like diaphragm member 11 which is integrally fabricated in one piece by molding the same of a resilient and flexible material impervious to attack by the material to be handled by the seal, such as a suitable synthetic rubber compound; an apertured, cup-like retaining member or flanged ring 12; a coiled expanding spring 13; and an annular face sealing element or nosepiece 14 which is retained in an undercut end of the diaphragm 11 by the retainer 12, under the action of said spring.

Structural details of the diaphragm, as well as the associated nosepiece, are illustrated in Fig. 2, while the features of the confining retainer or ring 12 are shown in Figs. 3 and 4. Fig. 1 shows an operative installation of the seal assembly 10 in relation to a pair of relatively rotating parts to be sealed, for example, the rotary shaft-driven impeller 15 of a washing machine and a fixed casing or like member 16.

Referring to Fig. 2, the diaphragm 11 is of circular section and is characterized by an axially extending sleeve portion 17 of predetermined radial thickness which merges to the left with an annular, radially outwardly extending base, flange or shoulder 18. A possible point of weakness at the junction of sleeve portion and flange 18 is avoided by the taper of the former, and at the same time a better control of the zone of axial flexure of the diaphragm is obtained, as will be described. The remainder of the sleeve portion is molded in a generally re-entrant, inwardly and reversely directed configuration, as indicated by the reference numeral 19, merging with a further axially extending portion 20 of restricted diameter. Said restricted diameter portion in turn merges to the right into a radially and axially thickened flange 21 through an intermediate tapered fillet 22. The latter is provided to avoid a sharp corner angle at this point, which might constitute a zone of weakness, and to localize the zone of flexure of the diaphragm adjacent the re-entrant inward formation 19.

The thickened forward flange 21 is provided with a radially undercut face groove or recess 23, at its forward side and adjoining the bore of the diaphragm, for the reception of the carbon, mild steel or similar, relatively rigid nosepiece 14, the outer wall 24 of said recess inclining rearwardly and radially outwardly to the rear abutment wall 25 of the recess. Nosepiece 14 has the external peripheral surface thereof tapered in conformity with the taper of the recess surface 24 whereby to be snugly received in the recess, as illustrated in Fig. 2. It is generally desirable to provide about a 3° taper of the peripheral surface of the diaphragm flange portion 21 rearwardly at 26, for a purpose which will appear.

Referring to Figs. 3 and 4 in conjunction with Fig. 1, the retaining member 12 is fabricated of an annular sheet metal stamping shaped in circular cup-like outline to provide the rear radial flange 27, which is centrally apertured at 28, and the forwardly projecting annular retaining rim 29. The latter is provided with diametrically opposed, radially projecting locking ears 30 for a purpose to be described. Rim 29 has an inner diameter approximating the outer diameter of the thickened diaphragm flange portion 21, enabling its axial telescoping over the latter.

In assembling the seal, the expansion spring 13 and the cupped retaining member 12 are disposed around the medial body portion of the diaphragm, with the spring abutting diaphragm flange 18 and the rear flange 27 of said member. Said retaining member is disposed to open forwardly or to the right, so that its rim 29 may encircle the periphery of the diaphragm flange 21 in operative position. When the parts are so positioned, retainer 12 is shifted rearwardly against the force of spring 13 to free the flange portion 21 from external confinement by rim 29 and to enable the said flange to be flexed to allow nosepiece 14 to be slipped into place in the undercut recess 23. The retainer is then allowed to spring forwardly in confining engagement with said thickened flange 21, compressing the flange and thereafter preventing inadvertent dislodgment of said nosepiece from the recess 23. The slight taper 26 of the flange 21 of the diaphragm facilitates disengagement and re-engagement of the retainer and diaphragm flange in the manner referred to.

In installed position, the rear flange 18 of the seal axially abuts a radially extending flange 31 or other surface of the member 16, while the nosepiece 14 is rotatively engaged by the mating ring 32, which is illustrated as carried in a counterbored recess 33 of the member 15. The latter may be secured to the rotary shaft 34 as by means of a set screw 35.

In operation, end play of the sealed parts is absorbed by axial telescoping movement and flexure of the body portion of diaphragm 11, said flexure being confined to the radial re-entrant portion 19. Spring 13 maintains effective axial sealing thrust on the assembly, urging the nosepiece 14 against the coacting mating ring 32. Rotation of the diaphragm seal assembly relative to the member 16 is prevented by engagement of the locking ears 30 in similarly spaced notches or recesses 36 in said member, as illustrated in Fig. 1. Under certain circumstances it may be found desirable to effect a similar angular locking of the thickened flange portion 21 of the diaphragm relative to the cup member 12 and to the nosepiece 14, although the friction produced between the parts as an incident to the confinement of said flange in the cup normally is sufficient for this purpose.

Two slightly modified embodiments of the foregoing assembly are illustrated in Figs. 5 through 8 of the drawings, wherein parts corresponding to parts shown in Figs. 1 to 4 inclusive are indicated by corresponding reference numerals. The form illustrated in Figs. 5, 6 and 7 is similar to that appearing in Figs. 1 through 4, with the exception of the shape and proportioning of the medial diaphragm configuration, here designated 38, whereby axial yielding of the diaphragm is facilitated.

As shown in Fig. 5, this portion is of somewhat lesser radial thickness than the portions of the diaphragm located on either side thereof and designated by the reference numerals 39, 40, respectively. Member 38 is molded in the form of a groove which extends radially inwardly in a generally semi-circular, U-shaped outline in the free condition of the seal shown in Fig. 5. When compressed and inserted in operative relation to the parts 15, 16 being sealed, the member 38 flexes axially and radially, as shown in Fig. 7. The provisions for receiving and locking the nosepiece 14 are similar to those described in connection with Figs. 1 through 4, as is also generally true of the cup member 12 which radially confines the nosepiece end of the diaphragm.

The modification illustrated in Fig. 8 differs from that illustrated in Figs. 5, 6 and 7 in that the diaphragm is provided with a medial inward formation 42 of angular or V-shaped outline between the axially extending portions 43, 44 on either side thereof. The material of this member 42 is also of somewhat lesser radial thickness than that of the remainder sleeve portions 43, 44 of the diaphragm body. Provisions for retaining the nosepiece 14 in place with respect to the diaphragm are similar to those discussed above.

In any of the foregoing modifications the seal is characterized by the low cost of production thereof and by the ease and speed with which the component parts are assembled to one another. The seal is devoid of special fastening means or adhesive or other connection between the nosepiece 14 and diaphragm, relying primarily on the peripheral confining and restricting action on the thickened forward flange and associated cup member to maintain said nosepiece in place.

The special flexing provisions in the diaphragm, i. e., formations 19, 38 or 42 in the body thereof, insure a desired responsivity in yielding axially in operation without failure of the diaphragm, especially at said formations.

I claim:

1. In an end thrust seal of the tubular diaphragm type, for use in connection with a shaft and a member rotatable relative to said shaft in stationary sealed engagement with said member and in external telescoping, rotatably sealed relation to said shaft, and in association with an annular nose piece of rigid material and a coil spring for yieldingly resisting endwise movement of the nose piece; a tubular diaphragm of soft flexible resilient material having said nose piece in fixed relation to an end thereof and being characterized by two radially extending end flanges against which the ends of the spring bear, and by tubular sections of different radial diameters located at the inner extremities of the end flanges and connected together at their adjacent ends by a radially extending web, said sections being free for flexing movement in areas of substantial size on opposite axial sides of said web and being adapted to partially telescope with respect to each other upon endwise collapse of the diaphragm, the smaller of said sections being of substantially larger diameter than the inner diameter of the nose piece and being of such size relative to said shaft as to provide substantial radial clearance with respect to the same.

2. In an end thrust seal of the tubular diaphragm type, for use in connection with a shaft and a member rotatable relative to said shaft in stationary sealed engagement with said member and in external telescoping, rotatably sealed relation to said shaft, and in association with an annular nose piece of rigid material and a coil spring for yieldingly resisting endwise movement of the nose piece; a tubular diaphragm of soft flexible resilient material having said nose piece in fixed relation to an end thereof and being characterized by two radially extending end flanges against which the ends of the spring bear, and by tubular sections of different radial diameters located at the inner extremities of the end flanges and connected together at their adjacent ends by a radially extending web, said sections being free for flexing movement in areas of substantial size on opposite axial sides of said web and being adapted to partially telescope with respect to each other upon endwise collapse of the diaphragm, the smaller of said sections being of such size relative to said shaft as to provide substantial radial clearance with respect to the same.

3. In an end thrust seal of the tubular diaphragm type, for use in connection with a shaft and a member rotatable relative to said shaft in stationary sealed engagement with said member and in external telescoping, rotatably sealed relation to said shaft, and in association with an annular nose piece of rigid material and a coil spring for yieldingly resisting endwise movement of the nose piece; a tubular diaphragm of soft flexible resilient material having said nose piece in fixed relation to an end thereof and being characterized by two radially extending end flanges against which the ends of the spring bear, and by concentric cylindrical sections of different radial diameters located at the inner extremities of the end flanges and connected together at their adjacent ends by a radially extending web, said sections being free for flexing movement in areas of substantial size on opposite axial sides of said web and being adapted to partially telescope with respect to each other upon endwise collapse of the diaphragm, the smaller of said sections being of such size relative to said shaft as to provide substantial radial clearance with respect to the same.

4. In an end thrust seal of the tubular diaphragm type, for use in connection with a shaft and a member rotatable relative to said shaft, in stationary sealed engagement with said member and in external telescoping, rotatably sealed relation to said shaft, and in association with an annular nose piece of rigid material and a coil spring for yieldingly resisting endwise movement of the nose piece; a tubular diaphragm of soft flexible resilient material having said nose piece in fixed relation to an end thereof and being characterized by two radially extending end flanges against which the ends of the spring bear, and by concentric cylindrical sections of different radial diameters located at the inner extremities of the end flanges and connected together at their adjacent ends by a radially extending web, said sections being free for flexing movement in areas of substantial size on opposite axial sides of said web and being adapted to partially telescope with respect to each other upon endwise collapse of the diaphragm, the smaller of said sections being of substantially larger diameter than the inner diameter of the nose piece and being of such size relative to said shaft as to provide substantial radial clearance with respect to the same.

JOHN H. SEFREN.

REFERENCES CITED

The following references are of record in the file of this patent:

UNITED STATES PATENTS

| Number | Name | Date |
|---|---|---|
| 770,600 | Morcom | Sept. 20, 1904 |
| 1,063,633 | Wilkinson | June 3, 1913 |
| 1,204,063 | Pratt | Nov. 7, 1916 |
| 1,822,052 | Maccabee | Sept. 8, 1931 |
| 2,027,505 | Winkler | Jan. 14, 1936 |
| 2,203,525 | Dupree | June 4, 1940 |
| 2,250,348 | Beier | July 22, 1941 |
| 2,362,363 | Doede | Nov. 7, 1944 |
| 2,379,868 | Curtis | July 10, 1945 |
| 2,395,095 | Brady | Feb. 19, 1946 |
| 2,419,385 | Beier | Apr. 22, 1947 |
| 2,444,713 | Solari | July 6, 1948 |
| 2,463,695 | Jensen | Mar. 8, 1949 |
| 2,464,988 | Payne | Mar. 22, 1949 |